United States Patent [19]

Schön

[11] Patent Number: 5,708,831
[45] Date of Patent: Jan. 13, 1998

[54] METHOD OF BUS ADDRESS ASSIGNMENT

[75] Inventor: Josef Schön, Landershofen, Germany

[73] Assignee: TEMIC Telefunken Microelectronic GmbH, Heilbronn, Germany

[21] Appl. No.: 202,166

[22] Filed: Feb. 25, 1994

[30] Foreign Application Priority Data

Mar. 18, 1993 [DE] Germany .................... 43 08 568.7

[51] Int. Cl.$^6$ .................................................. G06F 15/00
[52] U.S. Cl. .................... 395/800; 395/829; 395/200.1; 364/224.21
[58] Field of Search ................... 395/800, 200; 364/DIG. 1; 380/25; 340/825.52; 370/94, 85

[56] References Cited

U.S. PATENT DOCUMENTS

| | | |
|---|---|---|
| 4,000,378 | 12/1976 | Caplan ..................... 179/15 AL |
| 4,633,392 | 12/1986 | Vincent et al. . |
| 4,638,313 | 1/1987 | Sherwood, Jr. et al. . |
| 4,689,786 | 8/1987 | Sidhu et al. ................. 370/94 |
| 4,847,834 | 7/1989 | Bryant .......................... 370/85 |
| 4,918,598 | 4/1990 | Askin et al. ............ 364/DIG. 1 |
| 4,964,038 | 10/1990 | Louis et al. ............. 364/DIG. 1 |
| 5,029,209 | 7/1991 | Strong, Jr. et al. ............ 380/25 |
| 5,053,883 | 10/1991 | Johnson ........................ 358/349 |
| 5,157,658 | 10/1992 | Arai et al. .................. 370/85.11 |
| 5,276,442 | 1/1994 | Cree et al. ............... 340/825.52 |
| 5,304,992 | 4/1994 | Harashima .............. 340/825.52 |

Primary Examiner—Alyssa H. Bowler
Assistant Examiner—Walter D. Davis
Attorney, Agent, or Firm—Spencer & Frank

[57] ABSTRACT

To connect the various stations of a data processing system, a bus system is used, to which all users have access. In accordance with the invention, a method for automatic assignment of bus addresses is provided, whereby each user generates a random address that is enquired by a control unit. After clashes recognized by the control unit, this method is repeated until each user has been assigned a clear address.

4 Claims, 3 Drawing Sheets

METHOD OF BUS ADDRESS ASSIGNMENT

BACKGROUND OF THE INVENTION

The invention relates to a method for assigning bus addresses for a data processing system having a plurality of stations and a control unit (master).

To connect the various stations of a data processing system, a bus system is used via which messages are transmitted in unambiguous form from control unit to station or stations, or from station to station or stations. These stations can not only be microcomputers, but also input/output processors, function generators, memories, input/output devices such as keypads or display arrays, or sensors for physical/chemical quantities. Applications for this type of bus system connecting several stations include measured data recording and process control.

The manner in which information is transmitted depends mainly on the bus concept. In some systems, the stations are provided with station addresses, with the transmitted messages containing the addresses of transmitter and receiver. A station becomes the receiver of a message when it finds its station address in the message. The allocation of the station addresses can be achieved with either hardware or software.

In the known random time methods, the station addresses are generated by the individual stations answering after a random time with a random address on the bus. However, in order not to interfere with the communication on the bus, the user must first monitor the bus to find out whether it is free. If so, a logging-on procedure follows, and if not the user waits for a random-controlled time.

This known method therefore has the drawback that the stations must have a bus monitoring option, which makes the whole system very expensive.

SUMMARY OF THE INVENTION

The invention relates to a simple method for assigning bus addresses.

This object is achieved with the a method in which a control unit (master) first transmits to the stations a command for address generation, whereupon each station generates for itself a random address from a preset value range. Then the control unit begins to inquire—taking as its starting point the lowest address of the preset value range and using the data transmission record provided for the bus system—whether a station with the respective address exists. If the control unit receives from a station a reply which is without error, this reply contains a valid address, and the station is then informed by the control unit that its address has been accepted. In the other case, i.e. when the control unit receives a reply with an error, that is to say a non-valid address, it does not acknowledge it. The station identifies itself simultaneously with its reply, so that the control unit can clearly assign the called address to the identifying station.

The advantage of this method in accordance with the invention is that the data processing system can be expanded with stations as required, as far as the physical factors of the bus system permit, and without the need for changes in the software. For this reason, a bus system of this type is very flexible but nevertheless easy to implement.

In an advantageous embodiment of the invention, the station of which the address has been acknowledged sets an address flag. This ensures that, in a further preferred embodiment of the method in accordance with the invention, only those stations that have not yet set an address flag can take part in a repetition of the method after receipt of a non-valid address by the control unit.

After receipt of a non-valid address, the control unit can, before repetition of the method in accordance with the invention, first rename the valid addresses such that they are now generated starting from the lowest value of the permissible range in an ascending sequence. These renamed addresses are excluded from the permissible range for the subsequent assignment of random addresses. This leads to a further acceleration of the method for assigning bus addresses when there are more than 65 stations involved.

Finally, the automatic assignment of bus addresses can also be restricted to a group of stations, for example to receiving-only stations.

BRIEF DESCRIPTION OF THE DRAWINGS

The above and other features of the invention will become apparent from the following detailed description taken with the drawings in which.

DESCRIPTION OF THE PREFERRED EMBODIMENTS

A data processing system comprises several stations and a master station (or control unit) connected via a line, a so-called bus line. There are various station types, which are defined by their function, with stations having the same function allowing combination into groups. The following is based on a serial bus.

Figure 1:
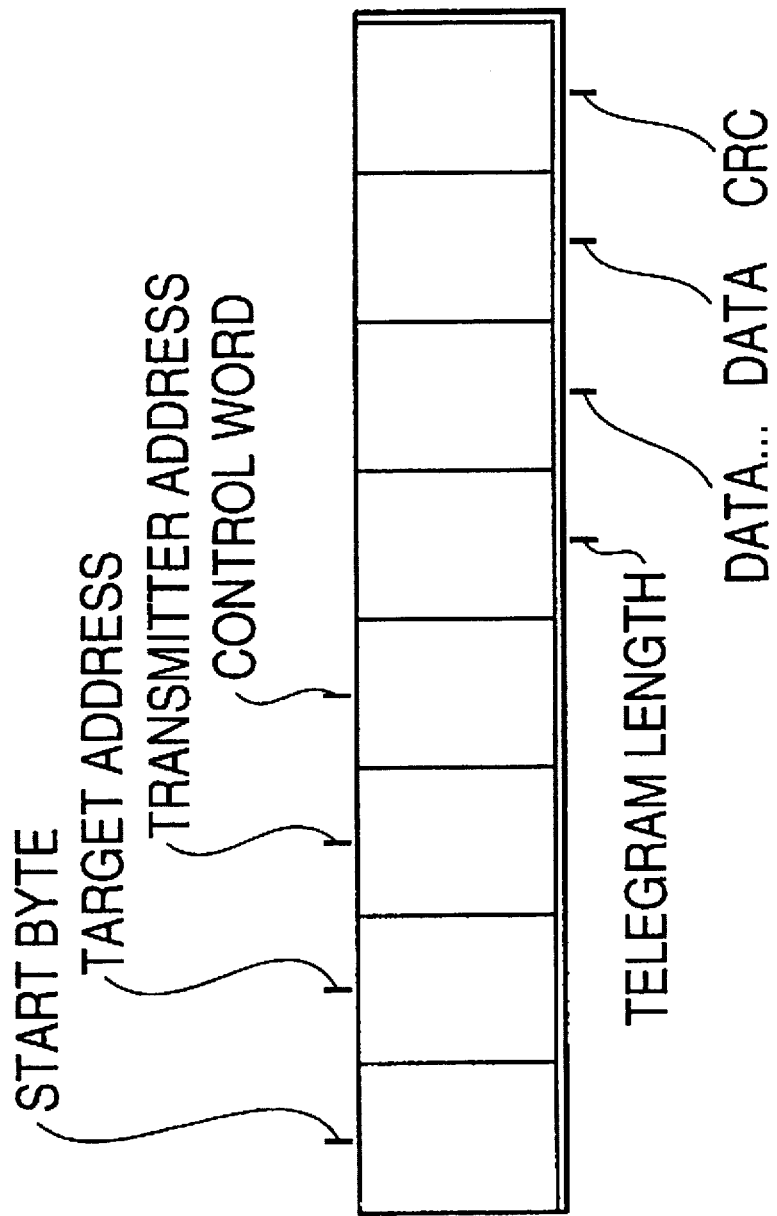
FIG. 1 is an example of a data transmission record in accordance with the present invention.

For the transmission of messages between the stations, the transmission record as shown in FIG. 1 is used, for example; this record stipulates—for the logic sequence of a communication between the stations—how these messages are exchanged in cycles. A message cycle generally comprises call and reply. A message comprises message fields shown as 8-bit bytes. The first message field, "start byte", shows the start of a new message and at the same time serves for synchronization. This is followed by the "target address" and the "transmitter address", with a certain target address being reserved for simultaneous addressing of all stations (global address).

The message field "control word" contains control data for the respective station, i.e. activity instructions.

Furthermore, the length of the message to be transmitted is given in the message field "telegram length". Also, two data fields for transmission of the message proper are provided. The end of the record is concluded by a safeguarding field "CRC". This Cyclic Redundancy Code (CRC) comprises a cyclically recurring redundancy code word for the detection of transmission errors.

Figure 2A:
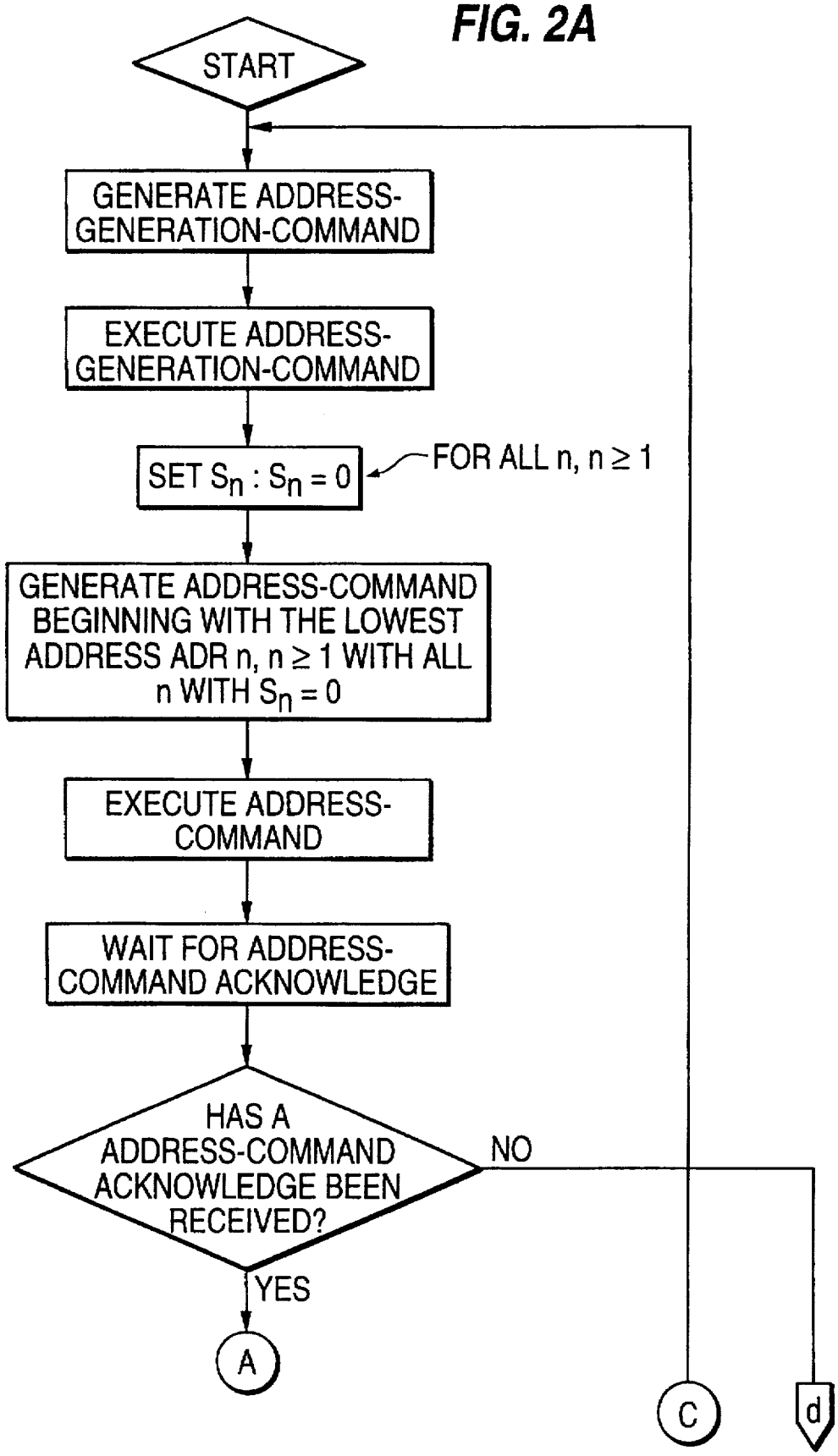
FIGS. 2A and 2B together form a flow diagram illustrating an embodiment in accordance with the present invention.
Figure 2B:
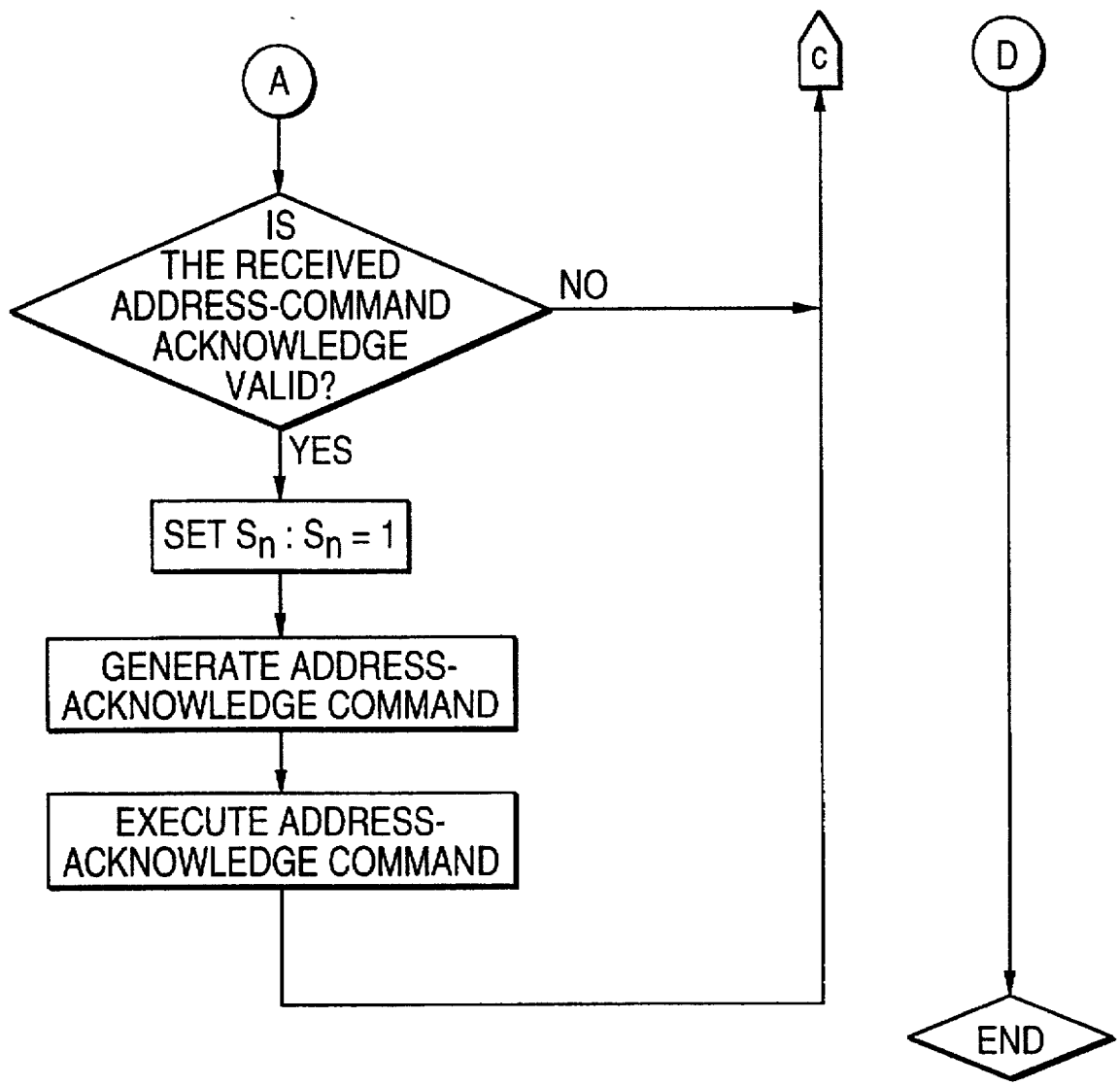

The method of address assignment is shown in FIGS. 2A and 2B. As can be seen from theses figures, to initialize the data processing system, the master station transmits to all stations—or to all the stations in one group—a command for address generation, for which reason the transmission record in accordance with FIG. 1 is used with the above global address. Each station then determines for itself a random address, for example from a free-running timer, in a permissible value range of 8 bits. The master station now starts, at the address 01h, to inquire whether a station with this address exists. This can be achieved with the READ service of the bus record. If the master station receives a reply which does not have a transmission error (i.e. CRC check OK), this address transmitted with the valid reply is acknowledged and the respective user is informed by the master station that the address has been accepted. This station sets an address flag for this success.

If by contrast the reply contains a transmission error, this indicates to the master station that at least two stations have the same random address. For that reason, no acknowledgement is given.

If at the end of an inquiry cycle only valid replies have been supplied by the stations, each station can be assigned a clear address. If this is not the case, the method is repeated, but with the command for address generation only being reacted to by those stations that have not set the address flag for successful address assignment.

In the case of the stations numbering less than 65, this method in accordance with the invention will lead very quickly to the location of the bus addresses. If however in a later expansion stage of the data processing system more stations have to be connected to the bus, the method for assigning bus addresses can be accelerated by the successful addresses being replaced by an ascending sequence of addresses that starts from the lowest permissible value, and by the permissible value range for the subsequent random assignment excluding the renamed addresses.

What is claimed is:

1. A method of assigning bus addresses for a data processing system, the data processing system including a plurality of transmitting and receiving stations and a control unit (master), in which communication between the stations and the control unit and between the stations themselves is via a bus system, the method of assigning bus addresses to the stations comprising:

a) transmitting with the control unit a command for address generation to the stations, b) in response to the command for address generation, determining in each station a respective random address from a preset value range on the bus, c) inquiring with the control unit, starting with a lowest address of the preset value range on the bus, whether a station with a respective address exists, and d) in response to the inquiring step, sending a reply to the control unit by any station having the address inquired about by the control unit;

wherein if the control unit receives a reply from a station indicating that a station having that respective address exists, and the reply contains no errors and is therefore a valid reply, the control unit informs that station which sent a reply that the respective address of that station has been accepted, setting an address flag in a station that has been informed that the respective address of that station has been accepted by the control unit, wherein if the control unit receives a reply from a station which contains an error and is therefore a non-valid reply, the control unit does not acknowledge the station sending the non-valid reply, and wherein after receiving a reply containing an error which is therefore a non-valid reply, changing with the control unit previously valid addresses to addresses in an ascending sequence starting from a lowest possible address, and performing steps a) to d) excluding previously assigned addresses from the preset value range on the bus for the respective random addresses.

2. A method according to claim 1, wherein the stations are combined into groups and wherein the control unit transmits to the stations in groups to command address generation.

3. A method according to claim 1, wherein a reply from a station which contains an error and is therefore a non-valid reply occurs when the reply contains a transmission error indicating to the control unit that two or more stations have the same address inquired about by the control unit.

4. A method according to claim 1, wherein at least the reply sent from a station includes a cyclic redundancy code, and wherein the control unit uses the cyclic redundancy code to determine whether a reply contains an error and is therefore a non-valid reply.

* * * * *